Nov. 28, 1967  G. LE ROY MARQUART  3,354,729
VEHICLE PLANETARY TRANSMISSION AND PTO
Filed April 4, 1966  2 Sheets-Sheet 1
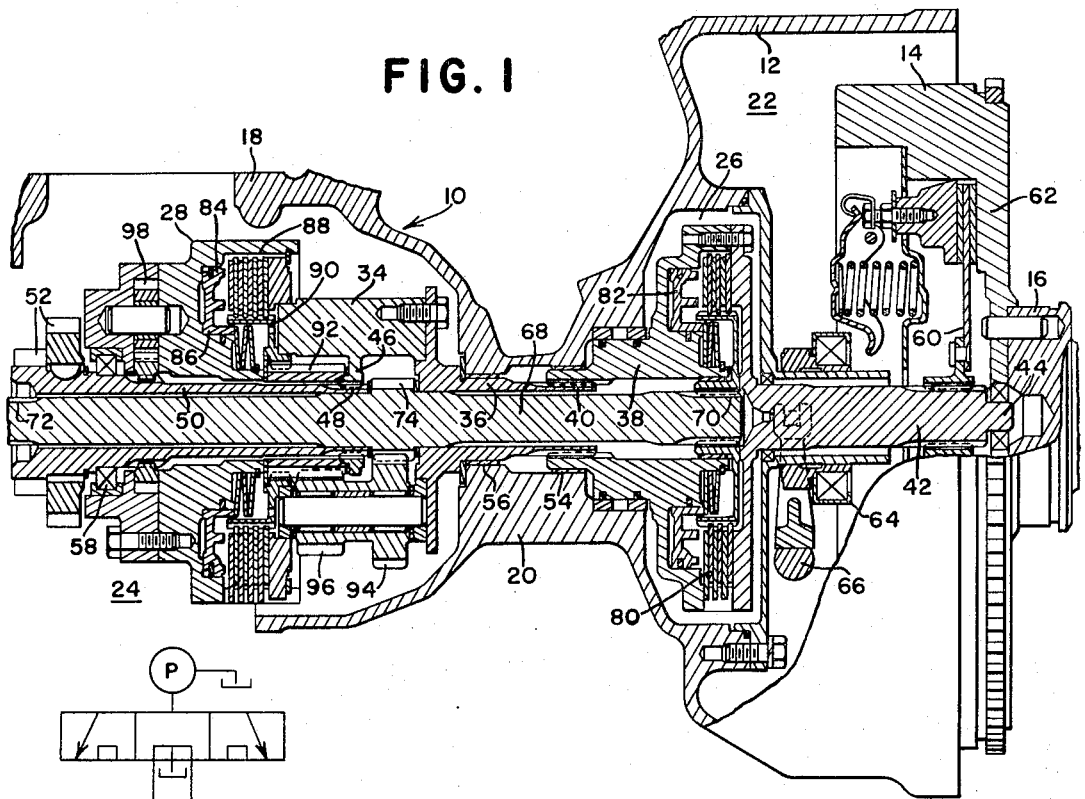
FIG. 1
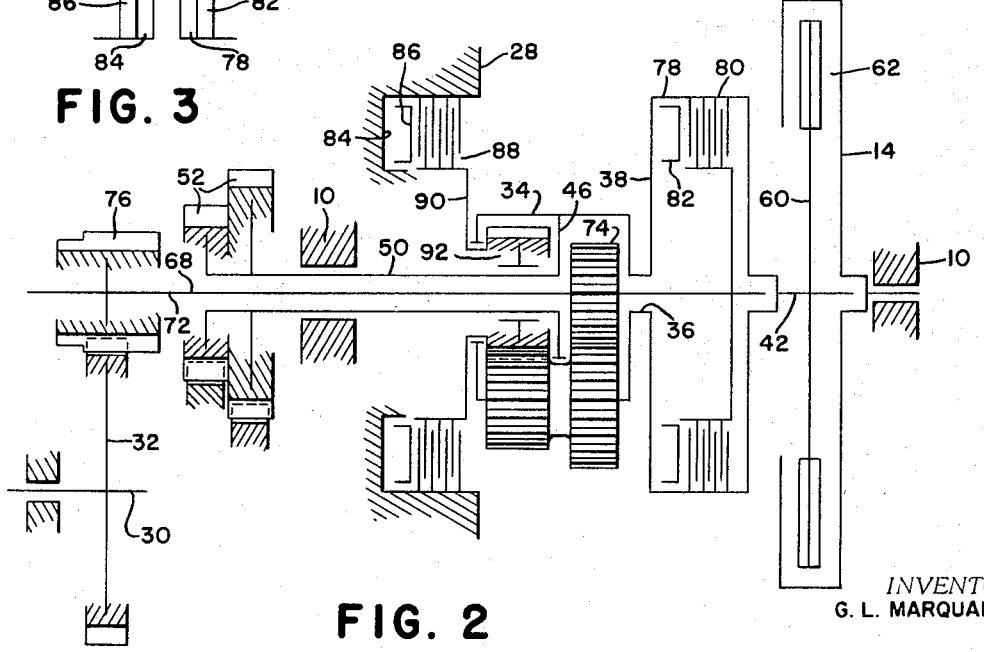
FIG. 3
FIG. 2
INVENTOR.
G. L. MARQUART Nov. 28, 1967  G. LE ROY MARQUART  3,354,729
VEHICLE PLANETARY TRANSMISSION AND PTO
Filed April 4, 1966  2 Sheets-Sheet 2
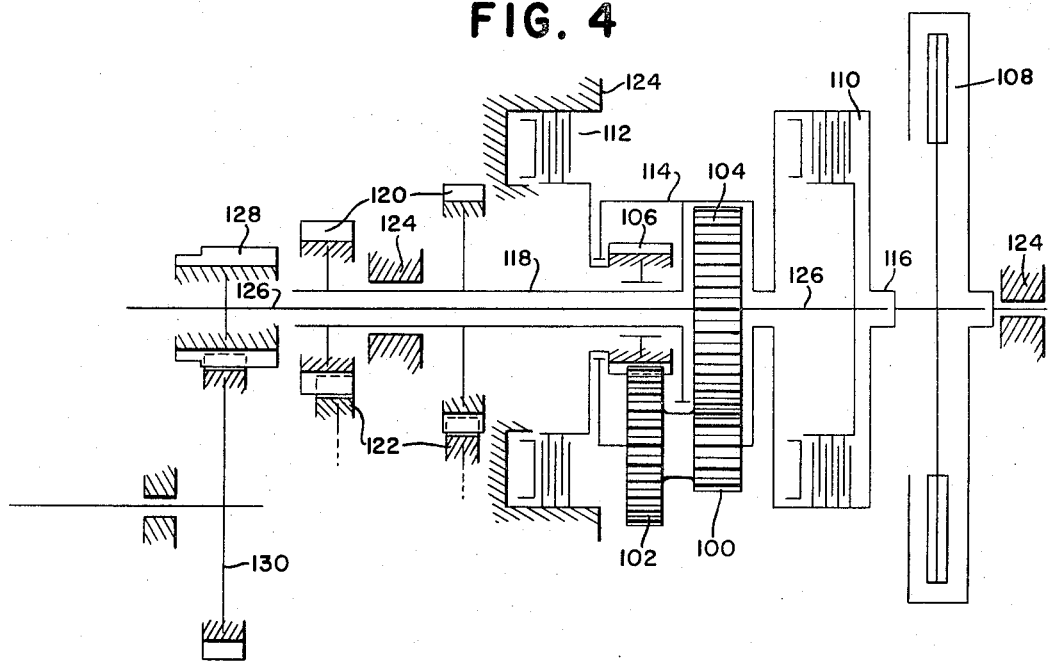
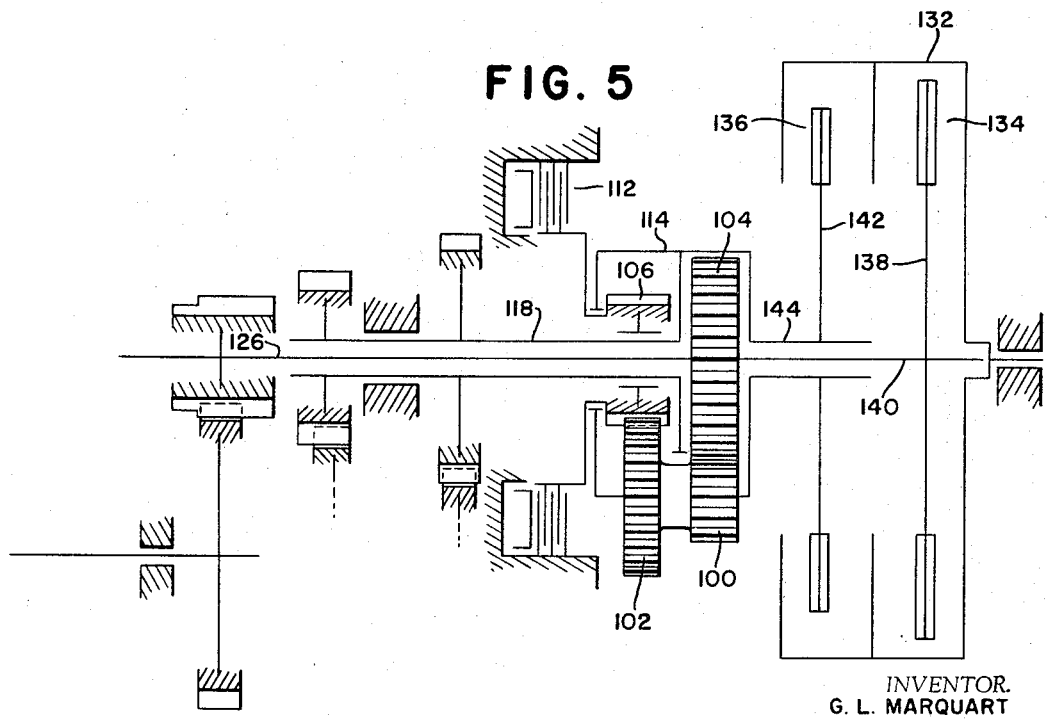
INVENTOR.
G. L. MARQUART

United States Patent Office 3,354,729
Patented Nov. 28, 1967

3,354,729
VEHICLE PLANETARY TRANSMISSION AND PTO
Gordon Le Roy Marquart, Jesup, Iowa, assignor to Deere & Company, Moline, Ill., a corporation of Delaware
Filed Apr. 4, 1966, Ser. No. 539,687
10 Claims. (Cl. 74—15.84)

This invention relates to a vehicle transmission and more particularly to a range transmission of the planetary type having special utility in agricultural and industrial tractors as an optional unit for modifying the basic ratios in the vehicle transmission and for providing a constantly-running PTO.

Most agricultural and industrial tractors have basic transmissions provided with a relatively large number of speed ratios, for example, six through ten speeds forward and two through four speeds in reverse, designed into the transmission to enable the vehicle to perform satisfactorily under normal operating conditions. It is known to adapt the vehicle to special circumstances by adding thereto an auxiliary dual-ratio or range transmission ahead of the main transmission, either as a high-low or as a forward-reverse unit for modifying the basic transmission ratios.

Among the problems encountered in the design and manufacture of such range transmissions is that of adapting a suitable unit to an acceptable vehicle configuration, for in most cases the vehicle is intended as a basic model to be normally furnished with the basic transmission, with the range transmission available as an option. Other problems involve cost, size, etc., of the range transmission and retention of the constantly-running characteristics of the vehicle PTO; that is, the PTO must run at a selected speed regardless of transmission ratio or direction and must also be capable of running even though the main or propulsion clutch of the vehicle is disengaged.

It is therefore the principal object of the invention to provide an improved range transmission of the character described, significant in that it is of low-cost design, compact in size, retains desirable PTO characteristics, is adaptable to a basic vehicle configuration, and employs a compact planetary unit with relatively small clutch and brake means and dispenses with the need for complicated over-running clutches, etc.

It is a further object to provide a basic design of such auxiliary transmission that lends itself readily to adaptation in several forms, either as a high-low or reverser unit, with propulsion and PTO clutches in series or in parallel.

Briefly, the foregoing and other objects are achieved by embodying in the vehicle housing a rotatable planetary carrier including coaxially affixed thereto in axially spaced apart relation a hollow, forward input shaft and a hollow, rearward PTO-drive shaft; a propulsion shaft extending coaxially loosely through the carrier and its shafts and having an input end ahead of the input shaft, an output end rearwardly of the PTO-drive shaft and an output sun gear affixed thereto intermediate the hollow carrier shafts; a reaction sun gear coaxially journaled about one of the hollow shafts; first and second conjointly rotatable planetary pinions journaled on the carrier and meshing respectively with the sun gears; a power source coaxially ahead of the propulsion shaft; first drive means connecting the power source to the input shaft for driving the carrier at a selected speed; brake means, engageable between the housing and the reaction gear for holding the latter to produce reduction drive in the propulsion shaft when the carrier is driven, and disengageable to release the reaction gear; and second drive means coaxially adjacent to the first drive means and connectible, to drive the propulsion shaft from the power source in unison with the carrier to produce direct drive in said propulsion shaft when the brake means is released and disconnectible to release the propulsion shaft when the brake means is engaged.

The foregoing and other important objects and features will become apparent from the following description of three forms of the invention as shown in the accompanying drawings.

FIG. 1 is a longitudinal sectional view through a reverser type of auxiliary transmission.

FIG. 2 is a schematic representation of the same.

FIG. 3 is a diagrammatic view of a representative hydraulic control system for operating the propulsion clutch and the reduction brake.

FIG. 4 is a schematic view, similar to FIG. 2, but showing the basic auxiliary transmission used as a high-low transmission.

FIG. 5 is a view similar to FIG. 4, showing a high-low transmission but having the propulsion and PTO clutches in parallel.

FIGS. 1, 2 and 3

In the illustration chosen to show this form of the invention by way of example, the numeral 10 designates the basic vehicle housing, which is here disposed fore and aft so that the front end is at the right-hand side of the sheet. The forward portion of the housing is enlarged at 12 to accommodate a fly-wheel 14 which may be connected to the rear end of a crankshaft 16 of an internal combustion engine (not shown). This may be taken as typical of any power source for driving the mechanism about to be described.

The rear portion of the housing at 18 is of smaller diameter than the portion 12 and the intermediate part of the housing intermediate the portions 12 and 18 is materially narrowed as at 20, thus providing the housing with front and rear compartments 22 and 24, respectively. The front compartment is further partitioned to provide a third compartment 26. Within the rear compartment 24 is an integral housing part 28.

The housing 10 may be the forward part of a typical transmission case including a change-speed transmission (not shown), one of the input shafts of which is shown at 30 (FIG. 2) as having fixed thereto a spur gear 32.

A basic part of the auxiliary transmission is the carrier 34, the intermediate part of which is contained within the housing compartment 24. Rigidly affixed to a forward portion of the carrier is a hollow forward input shaft 36, here made up of a rear part bolted to the carrier 34 and a foward part 38 splined at 40 to the part 36. The part 36 is enlarged and is hollow and continues thence forwardly as a part 42, the forward end of which is journaled at 44 in the flywheel and crankshaft 14–16. The carrier 34 has an intermediate wall portion 46 that is splined at 48 to a rearwardly extending hollow PTO-drive shaft 50, to the rear end of which are rigidly affixed a pair of PTO-drive gears 52. These may mesh in any suitable manner with PTO-drive means that ultimately terminates at the rear end, for example, of the vehicle (not shown).

It will be seen that the components making up the carrier and its hollow forward input shaft and its rearward PTO-drive shaft are rigidly interconnected. The whole is appropriately journaled, in addition to the pilot bearing at 44, on bearings 54, 56, and 58.

The forward end of the carrier input shaft portion 42 carries thereon a clutch disk or driven member 60 which, in conjunction with the flywheel 14 and other appropriate components, establishes a PTO clutch 62, actuation of which is accomplished by a throwout bearing 64 and operating yoke 66. So long as the clutch 62 is engaged, the carrier is driven and of course so are the PTO-drive gears 52.

A propulsion shaft 68 extends coaxially loosely through the carrier 34 and its associated hollow shafts and has a forward input end 70 and a rearward output end 72. Intermediate its ends, the shaft 68 has rigidly affixed thereto a sun gear 74 which is within the interior of the carrier 34. The output end 72 of the propulsion shaft 68 extends rearwardly of the rear end of the hollow carrier shaft 50 and has affixed thereto a spur pinion 76 which is, in this case, in constant mesh with the transmission input gear 32 previously described.

The hollow enlarged forward portion 38 of the carrier hollow shaft 36 is in the form of a clutch housing 78 that establishes the driving part of a propulsion clutch 80. In other words, the clutch housing 78 is in effect a portion of the driven part of the PTO clutch 62. The propulsion clutch 80 may be of the hydraulic-apply type and is therefore shown as containing a piston 82, to which fluid under pressure may be supplied in any known manner, representative of which is the arrangement shown in FIG. 3 wherein the pump supplies a typical three-way valve for alternately supplying fluid to the cylinder behind the propulsion clutch piston 82 or a cylinder 84 formed within the housing part 28, that part containing a piston 86 for effectuating engagement of a reduction drive brake 88 that operates between the housing part 28 and a coaxial cup 90 that is splined or otherwise affixed to a reaction sun gear 92 that loosely surrounds the hollow carrier shaft 50 just rearwardly of the drive sun gear 74.

The carrier 34 appropriately journals a plurality of planetary clusters, each of which includes a pair of conjointly rotatable planet pinions 94 and 96 that mesh respectively with the input sun gear 74 and the reaction sun gear 92. The clutch 80 and the brake 88 are normally biased by appropriate springs to disengaged or neutral positions. In addition to driving the PTO-drive gears 52, the hollow shaft 50 may also be utilized to drive other means, such as a hydraulic pump 98.

The operation of this form of the invention is as follows: When the vehicle is in its neutral status, the propulsion clutch 82 is disengaged or in neutral, as is the reduction brake 88. If the PTO clutch is engaged, the carrier and its associated shafts will of course continue to rotate. In this condition of things, the PTO-drive is continuously running; that is to say, it does not depend for operation on forward movement of the vehicle. Thus, the PTO-drive is independent of the auxiliary transmission unit and its continuously running ability is not affected by that unit. The PTO-drive may be disengaged at any time by disengaging the PTO clutch 62. In other instances, as is typical, a separate clutch may be provided in the PTO-drive line. Such details are immaterial here.

The relative ratios in the planetary unit are such that when the brake 88 is engaged to the exclusion of the propulsion clutch 80, the direction of rotation of the propulsion shaft 68 is just the reverse of what it would be when the propulsion clutch 80 is engaged to the exclusion of the reaction brake 88. Stated otherwise, engagement of the propulsion clutch 80, while of course the PTO clutch 62 is engaged, produces direct forward drive in the shaft 68 and this will produce the same drive in the associated basic transmission. When it is desired to reverse the vehicle, the operator disengages the propulsion clutch 80 and engages the brake 88. This of course holds the reaction sun gear 92 and the resulting planetary action provides, as previously stated, reverse drive of the propulsion shaft 68. The system shown in FIG. 3 provides an easy way for alternating between engagement and disengagement of the propulsion clutch 80 and reaction brake 88.

The vehicle may also be halted in either direction by disengagement of the PTO clutch 62, since this brakes the drive train from the power source to the carrier, and the vehicle will stop irrespective of whether either the clutch 80 or brake 88 is engaged.

FIG. 4

The transmission shown here is generally similar to that shown in FIG. 1 except that the reduction ratio in the planetary unit is such that the unit produces, alternatively, direct and reduction drives forwardly. This occurs because of the difference in the relative size of planetary pinions 100 and 102, that mesh respectively with an input sun gear 104 and a reaction sun gear 106. These two gears respectively occupy the positions and functions of the sun gears 74 and 92 of FIG. 1. Other similarities between the two constructions will be recognized, and therefore only a brief description of FIG. 4 will be resorted to. It will be seen that this drive includes a PTO clutch 108, a propulsion clutch 110 and a reaction brake 112. The input side of the propulsion clutch 110 is connected to the power source by the PTO clutch 108 and therefore the carrier 114, on which the planet pinions 100 and 102 are conjointly rotatable, rotates as long as the PTO clutch 108 is engaged. Again, the carrier includes the coaxial forward construction as at 116 and the hollow PTO rear drive shaft 118, to which are affixed a pair of axially spaced apart gears 120, providing a multiple PTO drive with associated meshing gears as shown at 122. Portions of the vehicle housing are shown at 124.

The propulsion clutch driven part is coaxially affixed to a propulsion shaft 126 to which the input sun gear 104 is affixed and at the rear end of which is coaxially affixed a spur gear 128 in constant mesh with a transmission input gear 130.

Operation of this transmission unit is exactly the same as that previously described, and the system of FIG. 3 may also be used here. The exception is, as previously set forth, that the transmission of FIGS. 1 and 2 produces forward and reverse and that of FIG. 4 produces two forward speeds, one direct or high and the other reduction or low. Direct drive is of course produced when the propulsion clutch 110 is engaged and the brake 112 is disengaged. Reduction drive occurs when the brake 112 is engaged to the exclusion of the clutch 110, in both cases it being assumed of course that the PTO clutch 108 is in engagement.

FIG. 5

This transmission is identical to that shown in FIG. 4 with the exception of the PTO and input clutches. Accordingly, the same reference characters will be used on the basic transmission rearwardly of the two clutches, thus identifying such things as the carrier 114, brake 112, planet pinions 100 and 102, input sun gear 104, reaction gear 106, hollow PTO shaft 118 and propulsion shaft 126.

In this case, the flywheel housing, shown at 132, has two compartments, in the forward one of which is located a propulsion clutch 134 and in the rearward one of which is located a PTO clutch 136. The driven part or disk 138 of the propulsion clutch is coaxially affixed to the forward end 140 of the propulsion shaft 126, whereas the clutch disk 142 is connected to the hollow forward portion 144 of the carrier 114. The difference between this construction and those previously described lies in the in-parallel relationship of the clutches 134 and 136 as compared to the inseries relationship of the clutches 62 and 80 of FIG. 2 and 108 and 110 of FIG. 4. However, since the clutches 134 and 136 are independently engageable and disengageable, it will be seen that so long as the PTO clutch 136 is engaged, the carrier will be driven and PTO drive will be available even though the propulsion clutch 134 is disengaged. When the propulsion clutch 134 is engaged exclusively of the reaction brake 112, the transmission unit provides forward direct drive. Conversely, when the brake 112 is engaged to the exclusion of the propulsion clutch 136, forward reduction drive is provided, engagement of the PTO clutch 136 again providing constant input to the carrier 114.

All forms of the invention have the same advantages of the continuously running PTO, compact construction, coaxial disposition of the propulsion shaft through the carrier, and the hollow input and output shafts on the carrier.

Features and advantages other than those enumerated herein will readily occur to those versed in the art, as will many modifications and alterations, all of which may be achieved without departure from the spirit and scope of the invention.

What is claimed is:

1. A vehicle transmission, comprising: a housing; a planet carrier journaled in the housing and including coaxially affixed thereto in axially spaced apart relation a hollow, forward input shaft and a hollow, rearward PTO-drive shaft; a propulsion shaft extending coaxially loosely through the carrier and having an input end ahead of the input shaft, an output end rearwardly of the PTO-drive shaft and an output sun gear affixed thereto intermediate said hollow shafts; means journaling said propulsion shaft in the housing; a reaction sun gear coaxially journaled about one of the hollow shafts; first and second conjointly rotatable planet pinions journaled on the carrier and meshing respectively with the sun gears; a power source coaxially ahead of the propulsion shaft; first drive means connecting the power source to the input shaft for driving the carrier at a selected speed; brake means, engageable between the housing and the reaction gear for holding the latter to produce reduction drive in the propulsion shaft when the carrier is driven, and disengageable to release said reaction gear; and second drive means coaxially adjacent to the first drive means and connectible to drive the propulsion shaft from the power source in unison with the carrier to produce direct drive in said propulsion shaft when the brake means is released, and disconnectible to release said propulsion shaft when the brake means is engaged.

2. The invention defined in claim 1, in which: the ratios among the sun gears and planet pinions are such that reduction drive is a forward speed lower than direct drive.

3. The invention defined in claim 1, in which: the ratios among the sun gears and planet pinions are such that reduction drive is a reverse speed as respects direct drive.

4. The invention defined in claim 1, in which: the reaction sun gear is to the rear of the output sun gear and the brake means is rearwardly of the carrier.

5. The invention defined in claim 1, in which: the first drive means includes a selectively engageable and disengageable first clutch having driving and driven parts connected respectively to the power source and input shaft, and the second drive means includes a second clutch selectively engageable between the first clutch driven part and the propulsion shaft.

6. The invention defined in claim 1, in which: the first drive means includes a selectively engageable and disengageable first clutch having driving and driven parts connected respectively to the power source and input shaft, and the second drive means includes a second clutch selectively engageable between the first clutch driving part and the propulsion shaft.

7. The invention defined in claim 1, in which: the first drive means includes a first clutch casing coaxially connected to and rotatable with the power source, a coaxial second clutch casing affixed to the input shaft intermediate said first casing and the carrier, and a clutch driven part affixed to the second casing and selectively engageable with and disengageable from said first casing, and the second drive means includes a clutch selectively engageable and disengageable between the second casing and the input end of the propulsion shaft.

8. The invention defined in claim 1, in which the second drive means clutch includes a driven part affixed to said input end of the propulsion shaft and has the second casing as its driving part.

9. The invention defined in claim 1, in which the first and second drive means comprise a clutch casing coaxially connected to and rotatable with the power source, a first driven clutch part affixed to the hollow input shaft and selectively engageable with and disengageable from the casing and a second driven clutch part affixed to the input end of the propulsion shaft and selectively engageable with and disengageable from said casing.

10. The invention defined in claim 1, in which: the carrier is generally of drum-like construction having cooperating annular and radial wall portions substantially enclosing the sun gears and the planet pinions.

References Cited

UNITED STATES PATENTS

| 2,756,600 | 7/1956 | Kamlukin et al. | 74—740 X |
| 2,982,153 | 5/1961 | Albertson et al. | 74—740 |
| 3,065,643 | 11/1962 | Mark et al. | 74—740 X |
| 3,094,012 | 6/1963 | Ferguson | 74—15.84 X |
| 3,094,013 | 6/1963 | Ferguson | 74—15.84 X |

DONLEY J. STOCKING, Primary Examiner.

L. H. GERIN, Assistant Examiner.